United States Patent [19]

Holzer et al.

[11] Patent Number: 5,099,104

[45] Date of Patent: Mar. 24, 1992

[54] ELECTRICALLY HEATABLE LAMINATED GLASS PLATES HAVING AN ELECTRICALLY CONDUCTIVE SURFACE COATING

[75] Inventors: Gerhard Holzer; Franz Kramling; Friedrich Triebs, all of Aachen, Fed. Rep. of Germany

[73] Assignee: Saint Gobain Vitrage International, Courbevoie, France

[21] Appl. No.: 610,490

[22] Filed: Nov. 7, 1990

[30] Foreign Application Priority Data

Nov. 9, 1989 [DE] Fed. Rep. of Germany ....... 3937346

[51] Int. Cl.$^5$ .............................. H05B 3/86; B60J 1/00; C03C 17/00; B32B 17/00
[52] U.S. Cl. ..................................... 219/203; 219/543; 338/309
[58] Field of Search ............... 219/543, 203, 523, 521, 219/541; 338/308, 309; 427/96

[56] References Cited

U.S. PATENT DOCUMENTS

| | | |
|---|---|---|
| 2,624,823 | 1/1953 | Lytle .................... 338/308 |
| 3,379,859 | 4/1968 | Marriott ................. 219/543 |
| 3,612,745 | 10/1971 | Warren ................. 174/68.5 |
| 3,811,934 | 5/1974 | Glaser .................. 219/543 |
| 4,010,304 | 3/1977 | Cohen .................. 428/213 |
| 4,100,398 | 7/1978 | Levin .................. 219/541 |
| 4,654,067 | 3/1987 | Ramus et al. ............ 65/60.5 |
| 4,668,270 | 5/1987 | Ramus ................. 65/106 |
| 4,744,844 | 5/1988 | Hurst .................. 219/203 |
| 4,786,784 | 11/1988 | Nikodem et al. ......... 219/543 |
| 4,820,902 | 4/1989 | Gillery ................. 219/203 |
| 4,830,876 | 5/1989 | Dietrich et al. ......... 427/96 |
| 4,844,985 | 7/1989 | Pharms et al. .......... 219/203 |

Primary Examiner—Bruce A. Reynolds
Assistant Examiner—John A. Jeffery
Attorney, Agent, or Firm—Pennie & Edmonds

[57] ABSTRACT

An electrically heatable car glazing (1) of laminated glass has a transparent surface coating (8) as the heating resistor. The outer glass plate (2) is provided, along the circumference of its inner side, with a frame-like heat-curing coating (6), and bus bars (7) of an electrically conductive heat-curing paint are provided on the frame-like coating. The surface coating (8) is placed over the bus bars (7), and metal foil bands (10) are placed above the bus bars (7) on the surface coating. The end portions (11) of the metal foil bands (10) are provided with a tear-proof plastic envelope (12), which is bonded to the glass plate (2).

31 Claims, 4 Drawing Sheets

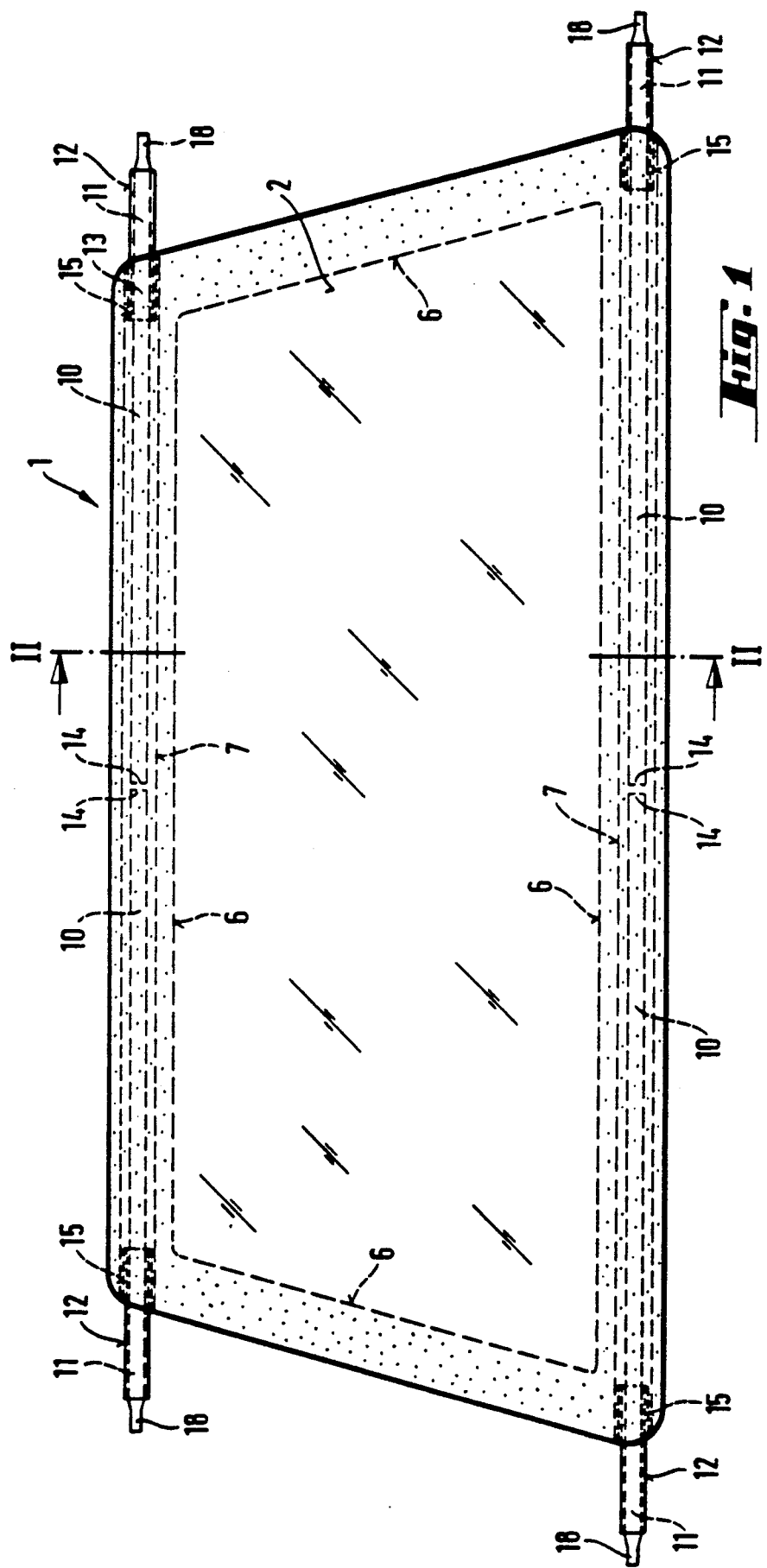

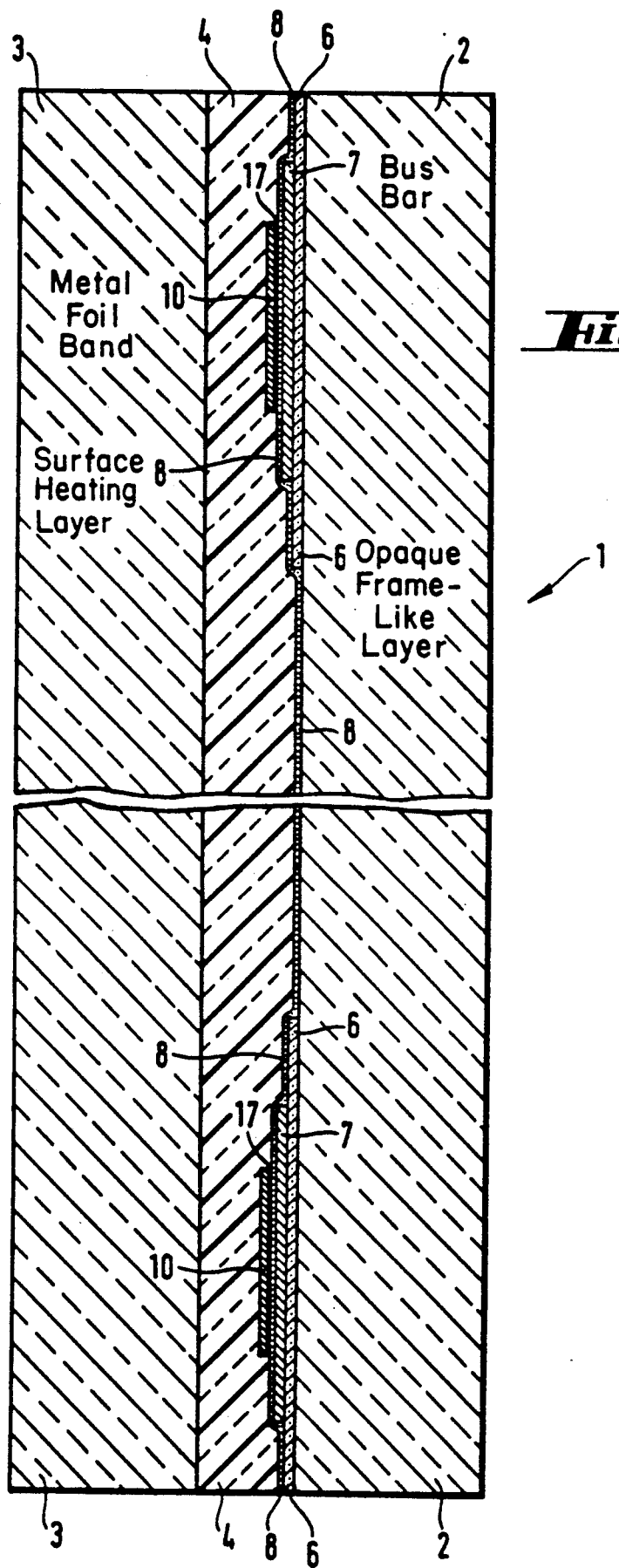

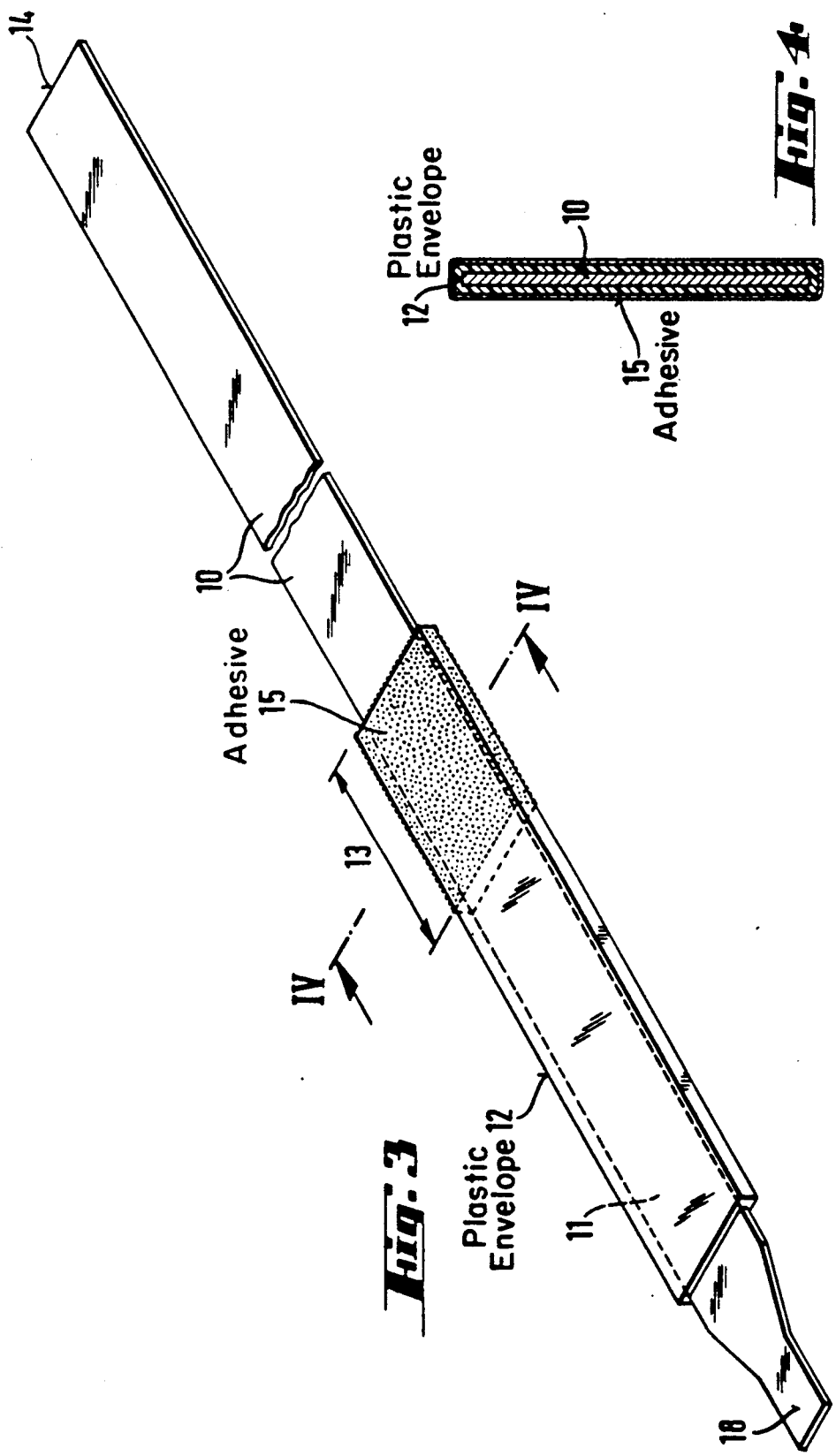

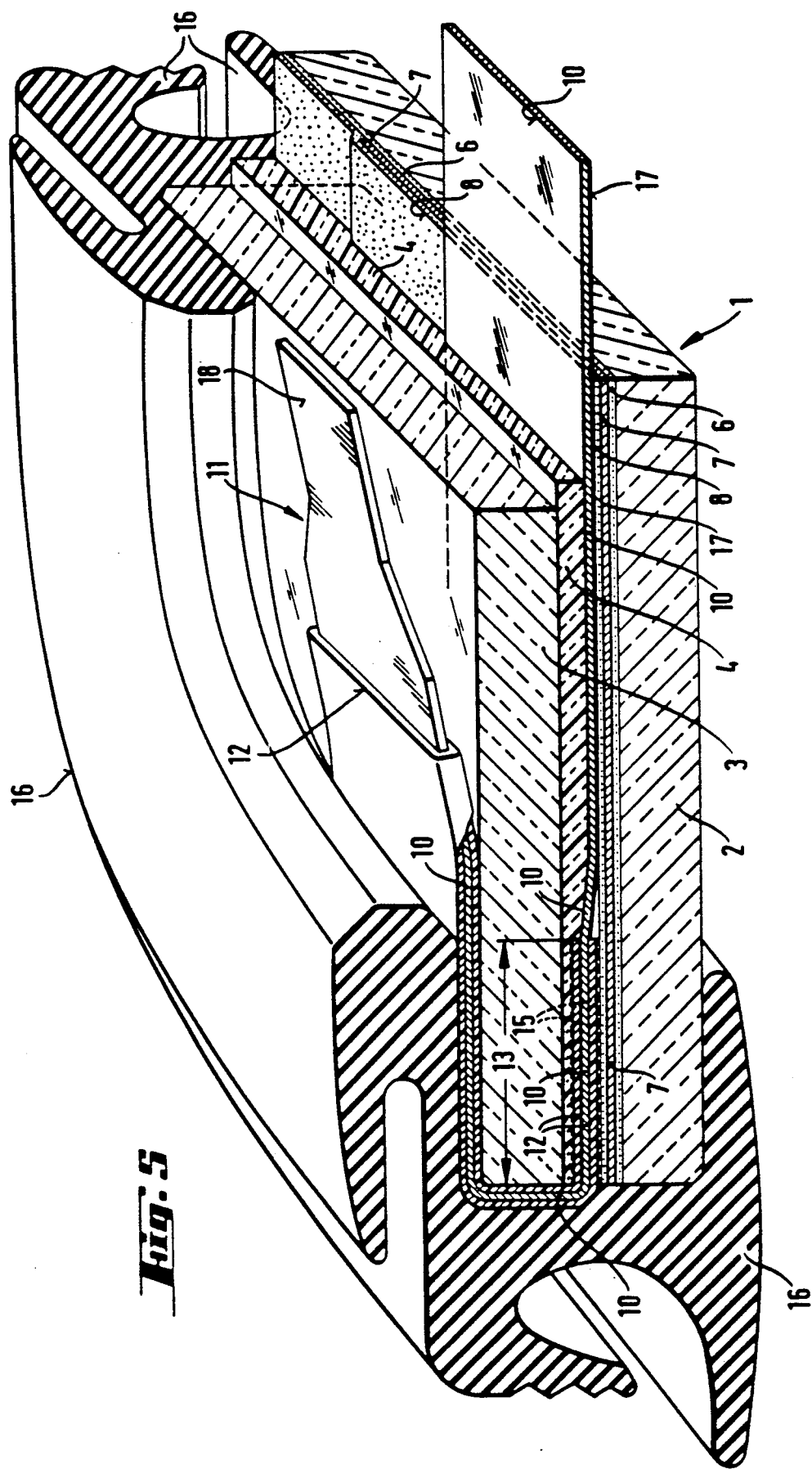

ELECTRICALLY HEATABLE LAMINATED GLASS PLATES HAVING AN ELECTRICALLY CONDUCTIVE SURFACE COATING

FIELD OF THE INVENTION

The present invention relates to electrically heated laminated glass plates commonly used as automobile windshields. More specifically, the invention relates to a laminate of two glass plates with an intermediate thermoplastic layer between them, and in which one of the glass plates has an electrically conductive and resistive heating coat, to which an electric current may be applied.

BACKGROUND OF THE INVENTION

Electrically heatable laminated glass plates with a continuous, transparent surface coating and bus bars in electrical contact therewith are known in numerous different constructions. It is known from U.S. Pat. No. 4,668,270 to first place on the glass surface bus bars composed of an electrically conductive heat curable paint, and then apply the transparent surface coating serving as the heating resistor to the glass surface and the bus bars. Power connection elements are electrically and conductively connected to current leads on the bus bars.

It is also known to initially apply the transparent electrically conductive surface coating to the glass surface and to apply the bus bars by printing an optionally heat curable conductive paste onto the surface coating, as disclosed in U.S. Pat. No. 4,830,876.

U.S. Pat. No. 4,820,902 discloses initially placing a decorative frame of an opaque heat curable paint on the inner surface of the outer glass plate (facing the thermoplastic intermediate layer), then printing the bus bars on the decorative frame from an electrically conductive heat curable paste. The surface coating serving as the heating resistor is then applied using a vacuum process. The current connecting cables are connected to the printed-on bus bars.

It has also been found desirable, when a construction such as that last mentioned is employed, to provide marginal cutouts on the second glass plate in the areas where the cables are connected to the bus bars on the first glass plate. This technique, shown in U.S. Pat. No. 4,654,067, thus provides space in the second plate into which the connections on the first plate fit.

It is also known in the art to initially apply the surface coating serving as the heating resistor to the glass surface and to use metal foil bands or strips for contacting purposes. These bands or strips are connected by means of an electrically conductive adhesive layer to the surface coating, as taught by U S. Pat. No. 3,612,745.

All of these prior art electrically heatable laminated glass plates with transparent heating resistor coatings, and all known processes for producing them, suffer from specific disadvantages. For example, in the case of contacting the heating resistor coating by metal foil strips, damage or even complete destruction of the heating resistor coating frequently occurs immediately alongside said strip during heating, because dangerous voltage and current peaks occur in the immediate vicinity of the strip. When contacting the heating resistor coating with the aid of printed-on, heat cured bus bars, the problem arises that either metallic plug contacts or cable portions must be soldered to the bus bars, but the soldered joints are located directly on the glass face and corresponding marginal cutouts must therefore be made in the second glass plate. This not only involves additional labor costs, but also leads to significant problems in connection with the sealing and fitting of the glass plate in the car body window frame.

It is therefore an object of the present invention to provide an electrically heatable car glass plate or windshield of the aforementioned type, in which the heating current is uniformly led to the resistance coating through bus bars without any risk of damage or destruction to the coating as a result of local voltage and current peaks.

It is a further object of the invention to provide such a glass plate or windshield in which connection of the bus bars within the laminated glass plate to the current leads outside the glass plate requires minimum effort and expenditure, without impairing the seal of the laminated glass plate on the edge and without making it more difficult to install the glass plate.

SUMMARY OF THE INVENTION

According to the invention this problem is solved in that thin metal film bands are arranged on the conductive and resistive surface coating and embedded in the thermoplastic intermediate layer, in electrical contact with the surface coating. The bands are aligned with the bus bar on the other side of the surface coating, extend substantially over the entire length of the particular bus bar, and are led laterally out of the circumferential surface of the laminated glass plate.

By thus arranging metal strips or bands, preferably 30 to 100 micrometers in thickness, on the opposite side of the surface coating from the bus bars, there is a surprisingly good and uniform coupling of the heating current into the surface coating, without local voltage and current peaks occurring in the coating. While, intrinsically, there is an intimate contact between the bus bars formed from heat curable paint and the resistive surface coating applied to it by vacuum coating, a comparable intimate contact between the metal foil band and the resistive coating is not absolutely necessary. It has in fact been found that the objective of the invention can also be achieved even where the surface contact between these two contact faces is interrupted or discontinuous.

The purely mechanical contact between the metal foil band and the surface coating can in certain circumstances prove adequate if the laminated glass plate is compressed in accordance with the standard production process in an autoclave at a pressure of more than 10 atmospheres excess pressure. It would appear that the point contacts to the surface of the metal bands resulting from the natural surface roughness of the heat cured bus bars are adequate to couple the electric current into the heat cured bus bars through the resistive coating in a problem-free manner, so that there is completely uniform transfer into the heating coating.

According to one embodiment of the invention, the metal foil bands are coated on one side with a thin adhesive coating, which is used for fixing the bands to the coated glass plate and facilitates the production process. If desired, the adhesive can be an electrically conductive adhesive. However, contrary to expectations, it has also been found that the object of the invention can also be achieved when the metal foil band is coated with an electrically non-conductive adhesive. It can be assumed that as a result of the pressure applied during the connection process, the particles projecting from the surface of the heat cured bus bars at the aforementioned point contacts displace the adhesive and that the resulting contact face is adequate for introducing the heating current into the bus bars.

According to another feature of the invention, the end regions of the metal foil bands are surrounded by a plastic envelope, from a part of the band embedded in the laminate to a part extending outside the laminate. This envelope increases the mechanical stability of the foil band portion and ensures the relief of stress from the metal band, and additionally produces a watertight adhesive bond between the metal foil and the glass plates or thermoplastic intermediate layer of the laminated glass plate.

Accordingly, a metal foil band is provided in alignment with each bus bar, and extends out of both sides of the laminate so that the heating current can be supplied via two current connecting lugs to each bus bar. This halves the current loading of the individual current connection lugs, so that the cross-section and therefore the thickness of the metal foil bands can be further reduced.

BRIEF DESCRIPTION OF THE DRAWINGS

Further features and advantages of the invention can be understood from the description of preferred embodiments and the drawings, wherein:

FIG. 1 is a plan view of the heatable laminated glass to plate according to the invention;

FIG. 2 is an enlarged cross-sectional view of the glass plate of FIG. 1;

FIG. 3 is a perspective view of the metal foil band used in accordance with the present invention;

FIG. 4 is a cross-sectional view of the metal foil band of FIG. 3; and

FIG. 5 is a perspective cut-away view of the glass plate of the invention, mounted in a rubber frame for installation.

DESCRIPTION OF THE PREFERRED EMBODIMENTS

FIGS. 1 and 2 show the construction of the heatable laminated glazing 1, which is to be used as a windshield in the window frame of a motor vehicle. The laminated glazing 1 comprises the single glass plate 2, which is on the exterior in the fitted state, the single glass plate 3 which is on the vehicle interior, and the intermediate layer 4 of thermoplastic material, e.g. polyvinyl butyral, interconnecting the two single glass plates.

Around the circumference of the inner surface of the single glass plate 2 is provided a frame-like layer 6 of an opaque heat curable paint. The layer 6 is printed on the initially planar glass plate 2 by a silk screen printing process. The printing ink is then dried to such an extent in a drying channel that a second printing process can be performed. During the second printing process, one bus bar 7 of an electrically conductive heat curable paint is printed on the layer 6 along the upper and lower edges of the glass plate 2, again using the silk screen printing process.

The next process stage consists of heat curing the layers 6 and 7 on the planar glass plate 2. For this purpose the glass plate 2 is passed through a roller furnace, in which the plate is heated to the necessary curing temperature of about 500 to 600° C.

The planar glass plate 2 provided with the cured layers 6 and 7 is then brought together with plate 3 and the glass plate pair is jointly bent in a known manner. After the joint bending of the two glass plates 2 and 3, the side of glass plate 2 which includes layers 6 and 7 is provided with the surface coating 8 serving as the heating resistor.

The surface coating 8 is applied by any known processes. Multiple coatings including an electrically conductive coating of silver have proved suitable as this surface coating 8. Above and below the silver coating are generally provided further coatings, particularly metal oxide coatings, which serve as adhesive and/or protective coatings and/or anti-reflection coatings for the silver coating. The application of the coatings preferably takes place by magnetic field assisted cathode sputtering or magnetic field assisted reactive cathode sputtering, to the extent that the coatings are metal compounds (particularly metal oxides). Coating structures and application processes suitable for use with the invention will be apparent to one skilled in the art.

In the next step, bands of metal foil 10 are placed on the surface coating 8 in alignment with the bus bars 7 and fixed to the glass plate 2, so that no displacement thereof occurs during the further handling of the glass plate 2. For this purpose, the metal foil bands 10 are provided on one side with a thin coating of a self-adhesive 17. This adhesive can be a non-conducting adhesive based on isoprene or acrylate, or can be an electrically conductive adhesive based on acrylate. The metal foil bands 10 have a width of 8 to 16 mm and a thickness of 30 to 80 micrometers and are preferably made from copper. They are applied in such a length to the glass plate 12 such that, a portion 11 of approximately 5 to 10 centimeters projects from the lateral edge of both sides of the glass plate 2.

As shown in detail in FIG. 3, the end portions of metal foil bands 10 are provided with an envelope 12 of a tear-resistant plastic. The plastic envelope 12 is connected in a firm, durable and vapor-tight manner to the metal band. The material for the envelope 12 can be, e.g., a polyimide plastic. The portion 13 of the outside of the envelope 12 coming into contact with the glass plate is provided with an adhesive coating 15 based on acrylate, silicone rubber or polysiloxane, which ensures the firm connection of the envelope 12 to the coated glass plate 2. Thus, any stress acting on the end portions 11 is transferred to the glass plate, so that the thin metal bands remain free of tension.

The metal foil bands 10 in each case comprise prepared portions having the described envelope 12 at only one end. The length thereof is such that they can be used for the largest occurring dimensions of the glass plates. As shown by FIG. 1, the two prepared metal foil bands 10 on each supply conductor 7 are fitted so that each band 10 extends roughly to the center of the bus bars 7. The ends 14 of the two metal foil bands 10 need not be in contact with one another and instead can terminate at a distance from one another without their function being impaired. Ends 14 are not provided with a plastic envelope 12 as with the other ends 11. By producing the metal foil bands with the same length, the bands can be manufactured in an economical manner and then shortened to the length required for the individual case.

After the glass plate 2 has been prepared in this way and provided with the metal foil bands 10, it is brought together with the second glass plate 3 in a usual way, e.g., with a 0.76 mm thick polyvinyl butyral film. Using heat and pressure, e.g., in a suitable pressure autoclave, the layers are now joined together to form the glass laminate.

The end portions 11 of the metal foil bands, provided with the stress-relieving envelope 12, have a limited thickness and relatively high flexibility. As shown by FIG. 5, they can easily be wrapped around the edge of the laminated glass plate where, for example, the plate 1 is to be provided with a profile frame 16 of a rubber-elastic material, which is used for installing the glass laminate in the vehicle body opening. The metal foil band portion 11 used for electrical current connection purposes has a contact lug 18 onto which is engaged the corresponding plug-in coupling of current lead following the installation of the laminate.

We claim:

1. An electrically heatable glass laminate, comprising:
   a first glass plate;
   a first layer of an electrically conductive coating upon at least a portion of one side of said first glass plate;
   a second layer of an electrically conductive surface coating covering said first layer and covering at least a portion of said one side of said first glass plate for providing heat when supplied with electricity;
   at least one metal foil strip on at least a portion of said second surface coating, said strip aligned with and extending substantially over the entire area of said first layer of conductive coating and in electrical communication with said surface coating for supplying electricity to said surface coating;
   a second glass plate; and
   means for joining said one said of said first glass plate to said second glass plate to form a laminate.

2. The laminate of claim 1, wherein said metal strip is copper.

3. The laminate of claim 1, further comprising a plastic envelope support structure around a portion of said metal foil strip, said envelope extending from within said laminate to outside said laminate.

4. The laminate of claim 3, wherein said envelope is of a polyimide plastic which is sealed vapor-tight around said metal strip.

5. The laminate of claim 4, further comprising a first adhesive provided on said envelope for joining said envelope to said surface coating.

6. The laminate of claim 5, wherein said adhesive is an acrylate, silicone rubber, or a polysiloxane.

7. The laminate of claim 5, further comprising an adhesive provided on said metal foil strip for joining said strip to said surface coating.

8. The laminate of claim 7, wherein the second adhesive is non-conductive.

9. The laminate of claim 3, wherein two metal strips extend from opposite edges along one end of said laminate to adjacent points near the middle of said laminate end.

10. The laminate of claim 1, wherein said first layer is located near an edge of said first glass plate, and said surface coating covers substantially all of the first glass plate not covered by said first layer.

11. The laminate of claim 1, further comprising an opaque coating between said first glass plate and said first layer.

12. The laminate of claim 1, wherein said joining means is a thermoplastic sheet.

13. The laminate of claim 1, wherein an opaque coating is provided around a circumferential portion of said one side of said first glass plate, said surface coating covers all of said glass plate not covered by said opaque coating, and said first layer, and at least two metal strips are provided longitudinally along respective upper and lower edges of said first glass plate.

14. The laminate of claim 13, wherein said laminate comprises four metal strips, two of said metal strips extending along said upper edge and two of said metal strips extending along said lower edge, and wherein said strips along said upper edge extend from opposite lateral edges of said glass plate to adjacent points near the middle of said upper edge, and wherein said strips along said lower edge extend from opposite lateral edges of said glass plate to adjacent points near the middle of said lower edge.

15. An electrically heatable glass laminate, comprising:
   a first glass plate;
   an opaque coating around a circumferential portion of one side of said first glass plate;
   a first layer of an electrically conductive coating upon a portion of said opaque coating;
   a second layer of an electrically conductive surface coating covering said first layer, said opaque paint in areas not covered by said first layer, and at least a portion of said one side of said glass plate in area not covered by said opaque paint.
   at least one metal foil strip on at least a portion of said second surface coating, said strip aligned with and extending substantially over the entire area of said first layer of conductive coating and in electrical communication with said surface for supplying electricity to said surface coating;
   a second glass plate; and
   a thermoplastic sheet positioned between the glass plates for joining said first glass plate to said second glass plate to form a laminate.

16. The laminate of claim 15, wherein said at least one metal foil strip extends from Within said laminate to outside said laminate, and further comprising a tear-resistant polyimide plastic envelope around a portion of said at least one metal strip, said envelope extending from within said laminate to outside said laminate, said envelope providing a vapor-tight seal around said metal strip.

17. The laminate of claim 16, wherein said envelope is joined to said surface coating by a first adhesive.

18. The laminate of claim 16, wherein said metal strip is joined to said surface coating by a second adhesive which is electrically conductive.

19. The laminate of claim 16, wherein said metal strip is joined to said conductive coating by a second adhesive which is electrically non-conductive.

20. The laminate of claim 16, wherein said metal strip is copper, and between 30 and 80 micrometers thick and between 8 and 16 millimeters wide.

21. The laminate of claim 16, wherein four metal strips are provided longitudinally along upper and lower edges of said first glass plate, two of said four metal strips extending from opposite lateral edges of said first glass plate along the upper edge to adjacent points near the middle of the upper edge, and two of said four metal strips extending from opposite lateral edges of said first glass plate along the lower edge to adjacent points near the middle of the lower edge.

22. In an electrically heatable glass laminate having first and second glass plates joined across inner surfaces, wherein the inner surface of said first glass plate is coated over at least a first portion thereof with a first electrically conductive coating and over at least a second portion thereof with a second electrically conductive coating, said first conductive coating being in electrical communication with said second conductive coating. the improvement comprising providing at least one metal foil strip on at least a portion of said second surface coating, said strip aligned with and extending substantially over the entire area of said first layer of conductive coating and in electrical communication with said second electronically conductive coating for supplying electricity to said first and second coatings.

23. The improved laminate of claim 22, wherein said first coating is located along at least one end of said first glass plate and said at least one metal strip is located across said second coating from said first coating.

24. The improved laminate of claim 23, wherein said metal strip is joined to said second coating by an adhesive.

25. The improved laminate of claim 24, wherein said adhesive is electrically non-conductive.

26. The improved laminate of claim 23, wherein said metal strip is joined to said second coating by applying at least ten atmospheres excess pressure in an autoclave.

27. The improved laminate of claim 22, wherein said at least one metal strip extends from within said laminate to outside said laminate.

28. The improved laminate of claim 27, further comprising a tear-resistant plastic envelope around a portion of said at least one metal strip, said envelope extending from within said laminate to outside said laminate, said envelope providing a vapor-tight seal around said strip.

29. An electrically heatable glass laminate, comprising:
   a first glass plate;
   a first layer of an electrically conductive coating upon at least a portion of one side of said first glass plate;
   a second layer of an electrically conductive surface coating covering said first layer and covering at least a portion of said one side of said first glass plate for providing heat when supplied with electricity;
   four metal foil strips in electrical communication with said surface coating for supplying electricity to said surface coating, two of said metal strips extending along said upper edge and two of said metal strips extending along said lower edge, said upper edge strips extending from opposite lateral edges of said glass plate to adjacent points near the middle of said upper edge, and said lower edge strips extending from opposite lateral edges of said glass plate to adjacent points near the middle of said lower edge.

30. An electrically heatable glass laminate, comprising:
   a first glass plate;
   an opaque coating around a circumferential portion of one side of said first glass plate;
   a first layer of an electrically conductive coating upon a portion of said opaque coating;
   a second layer of an electrically conductive surface coating covering said first layer, and at least a portion of said one side of said glass plate in areas not covered by said opaque paint;
   at least one copper foil strip between 30 and 80 micrometers thick and between 8 and 16 millimeters wide in electrical communication with said surface coating for supplying electricity to said surface coating, said foil strip extending from within said laminate to outside said laminate, and further comprising a tear-resistant polyimide plastic envelope around a portion of said at least one metal strip, said envelope extending from within said laminate to outside said laminate, said envelope providing a vapor-tight seal around said metal strip;
   a second glass plate; and
   a thermoplastic sheet positioned between the glass plates for joining said first glass plate to said second glass plate to form a laminate.

31. The laminate of claim 30, wherein four metal strips are provided longitudinally along upper and lower edges of said first glass plate, two of said four metal strips extending from opposite lateral edges of said first glass plate along the upper edge to adjacent points near the middle of the upper edge, and two of said four metal strips extending from opposite lateral edges of said first glass plate along the lower edge to adjacent points near the middle of the lower edge.

* * * * *